(12) United States Patent
Song et al.

(10) Patent No.: US 9,548,481 B2
(45) Date of Patent: Jan. 17, 2017

(54) BATTERY MODULE

(71) Applicants: SAMSUNG SDI CO., LTD., Yongin-si, Gyeonggi-do (KR); ROBERT BOSCH GMBH, Stuttgart (DE)

(72) Inventors: Jang-Hyun Song, Yongin-si (KR); Yong-Sam Kim, Yongin-si (KR); Jong-Woo Nam, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 133 days.

(21) Appl. No.: 13/944,046

(22) Filed: Jul. 17, 2013

(65) Prior Publication Data

US 2014/0227564 A1    Aug. 14, 2014

(30) Foreign Application Priority Data

Feb. 8, 2013 (KR) .................. 10-2013-0014652

(51) Int. Cl.
   *H01M 2/12* (2006.01)
   *H01M 2/06* (2006.01)
   *H01M 2/22* (2006.01)
   *H01M 2/30* (2006.01)

(52) U.S. Cl.
   CPC ............. *H01M 2/1235* (2013.01); *H01M 2/06* (2013.01); *H01M 2/22* (2013.01); *H01M 2/30* (2013.01)

(58) Field of Classification Search
   CPC ............ H01M 2/22; H01M 2/06; H01M 2/30; H01M 2/1235; H01M 2/12; H01M 2/1205; H01M 2/1247; H01M 2/1249
   USPC ............................................ 429/53
   See application file for complete search history.

(56) References Cited

U.S. PATENT DOCUMENTS

| | | | |
|---|---|---|---|
| 2009/0263703 A1* | 10/2009 | Kim .................... | H01M 2/0404 429/53 |
| 2012/0156536 A1* | 6/2012 | Yamazaki ............... | H01M 2/06 429/96 |
| 2012/0196162 A1* | 8/2012 | Shiraishi ............. | H01M 2/1229 429/56 |

* cited by examiner

*Primary Examiner* — Patrick Ryan
*Assistant Examiner* — Kiran Akhtar
(74) *Attorney, Agent, or Firm* — Lee & Morse P.C.

(57) ABSTRACT

A battery module includes an electrode assembly in a case, at least one current collector in the case, the current collector being electrically connected to the electrode assembly, a cap plate covering the case, the cap plate including a safety vent and at least one terminal inserter penetrating the cap plate, at least one terminal part including a terminal plate outside the case and a connector connecting the at least one current collector to the terminal plate through the at least one terminal inserter, at least one fixing member fixing the terminal part into the cap plate, and a groove pattern in an area of the cap plate adjacent to the safety vent.

20 Claims, 9 Drawing Sheets

BATTERY MODULE

CROSS-REFERENCE TO RELATED APPLICATION

The present application claims benefit of Korean Patent Application No. 10-2013-0014652, filed on Feb. 8, 2013, in the Korean Intellectual Property Office, and entitled: "Battery Module," which is incorporated by reference herein in its entirety.

BACKGROUND

1. Field

One or more embodiments relate to a battery module including a cap assembly structure having high process stability.

2. Description of the Related Art

In general, a secondary battery is a rechargeable and dischargeable battery, which differs from an un-rechargeable primary battery. The secondary battery may be used as an energy source of, e.g., a mobile device, an electric car, a hybrid car, an electric bicycle, an uninterruptible power supply, or the like. The secondary battery may be used as a single battery or a battery module, in which a plurality of batteries are electrically connected to one another by using a bus bar, according to a type of an external device to which the secondary battery is applied.

A small mobile device, e.g., a cellular phone, operates only for a predetermined time based on power and capacity of a single battery. However, if extended periods of driving and a high performance driving are to be performed by an electric car, a hybrid car, or the like, a battery module may be required to provide sufficient power and capacity.

An output voltage or an output current of the battery module is increased according to the number of batteries installed in the battery module. Therefore, the battery module may include a plurality of batteries connected to one another in series or in parallel to obtain the desired output voltage or current of the battery module.

SUMMARY

One or more embodiments are directed to a battery module with a cap assembly structure having a high process stability when manufacturing the battery module.

According to one or more embodiments, a battery module includes an electrode assembly in a case, at least one current collector in the case, the current collector being electrically connected to the electrode assembly, a cap plate covering the case, the cap plate including a safety vent and at least one terminal inserter penetrating the cap plate, at least one terminal part including a terminal plate outside the case and a connector connecting the at least one current collector to the terminal plate through the at least one terminal inserter, at least one fixing member fixing the terminal part into the cap plate, and a groove pattern in an area of the cap plate adjacent to the safety vent.

The fixing member may have a plastic mold structure, the plastic mold structure including a plastic resin filling the terminal inserter around the connector.

The terminal plate may be spaced apart from an upper surface of the cap plate.

The connector may include a first bending part extending downwardly from the terminal plate, and a second bending part extending from the first bending part in parallel with the terminal plate.

The second bending part may be partially buried in the fixing member.

The second bending part may be entirely buried in the fixing member.

The fixing member may include a first fixer filling the terminal inserter and a second fixer filling the gap between the terminal plate and the upper surface of the cap plate.

The second fixer may extend to an upper portion of the first fixer.

The second fixer may extend across an edge of the terminal inserter.

The fixing member may include an insulating gasket between the connector and the cap plate, the insulating gasket filling a space between the connector and the terminal inserter.

The insulating gasket may include an upper gasket extending from an upper surface of the cap plate into the terminal inserter, and a lower gasket extending from a lower surface of the cap plate into the terminal inserters.

The groove pattern may include a plurality of grooves that are symmetrical to one another with respect to the safety vent.

The groove pattern may include a first groove and a second groove spaced apart from each other across the safety vent in a longitudinal direction of the cap plate.

The first and second groove may be spaced apart from each other along a first direction, the safety vent extending along the first direction between the first and second grooves.

A plurality of the first grooves may be spaced apart from one another along a second direction perpendicular to the first direction, and a plurality of the second grooves is spaced apart from one another along the second direction.

The groove pattern may further include a third groove and a fourth groove spaced apart from each other across the safety vent along a second direction perpendicular to the first direction.

The safety vent may be parallel to and between the third and fourth grooves.

The groove pattern may include a groove having a shape surrounding the safety vent.

The groove may have a ring shape corresponding to an external outline of the safety vent.

The groove pattern may include a plurality of discrete grooves spaced apart from one another, the plurality of grooves being arranged in a shape surrounding the safety vent.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in many different forms and should not be construed as being limited to the embodiments set forth herein. Rather, these embodiments are provided so that this disclosure will be thorough and complete, and will fully convey the concept of the invention to those skilled in the art.

In the drawings, the thicknesses of layers and regions may be exaggerated for clarity. It will also be understood that when a layer, e.g., an element, is referred to as being "on" another layer or substrate, it can be directly on the other layer or substrate, or intervening layers may also be present. Like reference numerals in the drawings denote like elements throughout, and thus their descriptions will be omitted.

Figure 1:
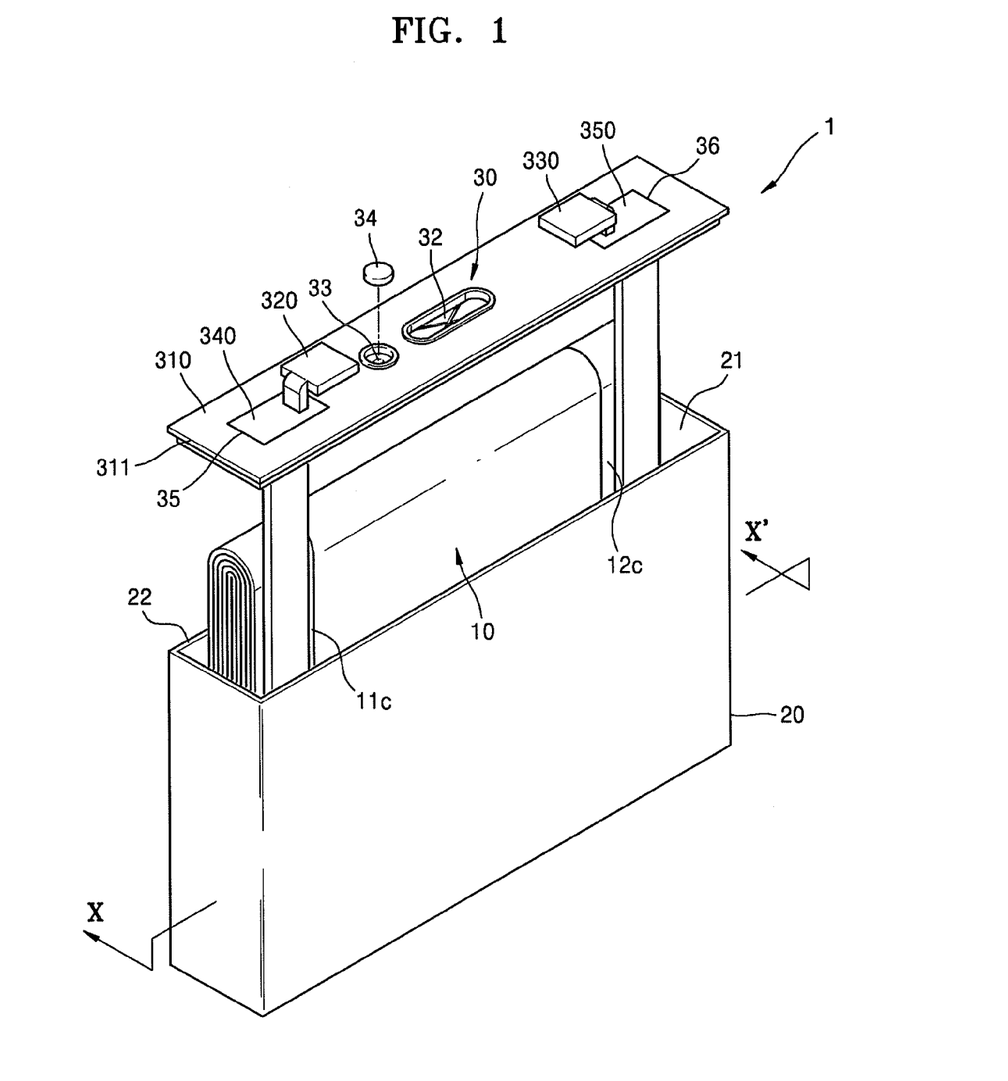
FIG. 1 illustrates an exploded perspective view of a battery module according to an exemplary embodiment.
Figure 2:
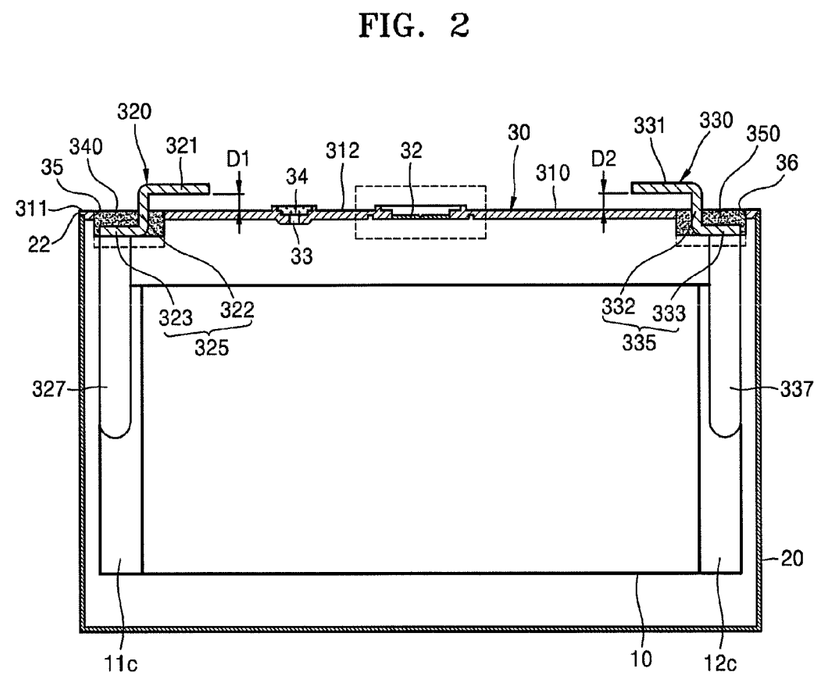
FIG. 2 illustrates a cross-sectional view taken along a line X-X' of FIG. 1.

FIG. 1 illustrates an exploded perspective view of a battery module 1 according to an exemplary embodiment. FIG. 2 is a cross-sectional view along line X-X' of FIG. 1.

Referring to FIGS. 1 and 2, the battery module 1 includes an electrode assembly 10, a case 20, and a cap assembly 30. The case 20 houses the electrode assembly 10, and the cap assembly 30 is connected to the electrode assembly 10 and closes an upper end of the case 20.

The battery module 1 may be a secondary battery, e.g., a lithium-ion battery. However the battery module 1 may include other types of secondary batteries, e.g., a cylindrical battery module, a rectangular battery module, or a polymer battery module. Therefore, the battery module 1 is not limited to one type of a battery module.

The cap assembly 30 may include a cap plate 310, current collectors 327 and 337, and fixing members 340 and 350. The current collectors 327 and 337 are electrically connected to the electrode assembly 10. The fixing members 340 and 350 respectively fix terminals 320 and 330, respectively, to the cap plate 310.

The case 20 includes an opening 21 into which the electrode assembly 10 is inserted, and the cap plate 310 may be combined with the case 20 to seal the opening 21. For this purpose, an edge 311 of the cap plate 310 may be combined with an upper edge 22 of the case 20 defining the opening 21. In this state, the cap plate 310 is combined with the case 20, e.g., by welding or the like, to form a housing for the electrode assembly 10.

The cap plate 30 may further include a safety vent 32, e.g., that is designed to be destructed to provide a discharge path for gas if pressure in the case 20 exceeds a predetermined pressure. Also, the cap plate 30 may include an inlet 33, through which an electrolyte is injected into the case 20. After the electrolyte is injected into the case 20, the inlet 33 is closed by a sealing stopper 34. A groove pattern is formed in the cap plate 310, e.g., around the safety vent 32, to attenuate vibrations in an area adjacent to the safety vent 32. The groove pattern will be described in more detail below with reference to FIGS. 4-6.

Figure 3:
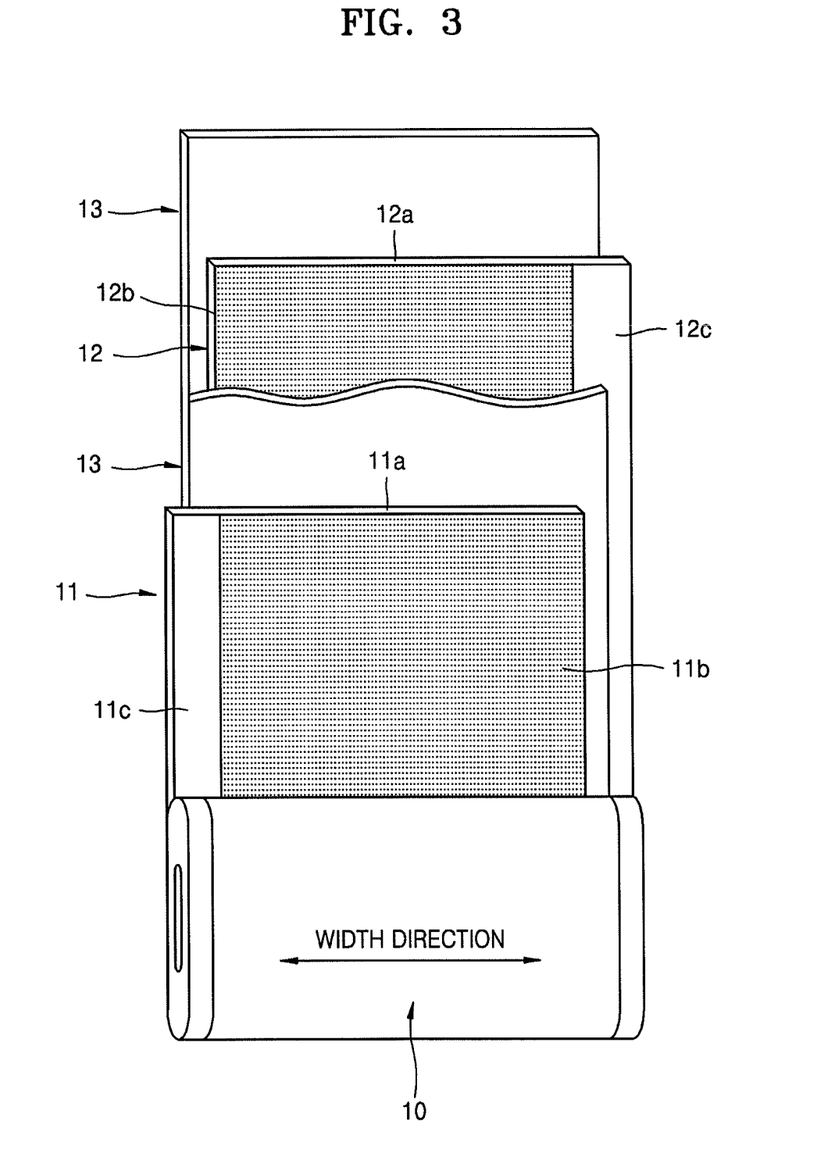
FIG. 3 illustrates a perspective view of an electrode assembly according to an exemplary embodiment.

Referring to FIG. 3, the electrode assembly 10 may include a positive plate 11, a negative plate 12, and a separator 13 interposed between the positive plate 11 and the negative plate 12. For example, a stack structure of the positive plate 11, the negative plate 12, and the separator 13 may be wound in a jelly-roll form.

The positive plate 11 may include a positive current collector 11a and a positive active material layer 11b formed on at least one side of the positive current collector 11a. A positive active material non-coated part 11c is provided at an edge along a width direction of the positive current collector 11a. Here, the positive active material layer 11b is not formed at the active material non-coated part 11c. The negative plate 12 may include a negative current collector 12a and a negative active material layer 12b formed on at least one side of the negative current collector 12a. A negative active material non-coated part 12c is formed at an edge along a width direction of the negative current collector 12a. Here, the negative active material layer 12b is not formed at the negative active material non-coated part 12c. The positive active material non-coated part 11c and the negative active material non-coated part 12c may be spaced apart from each other in a width direction of the electrode assembly 10. For example, the positive active material non-coated part 11c and the negative active material non-coated part 12c may be disposed at both edges of the width direction of the electrode assembly 10.

The terminals 320 and 330 may be a positive terminal and a negative terminal, respectively. The positive terminal 320 and the negative terminal 330 may be electrically connected to the positive active material non-coated part 11c and the negative active material non-coated part 12c of the electrode assembly 10, respectively. The positive active material non-coated part 11c and the negative active material non-coated part 12c of the electrode assembly 10 may be electrically exposed outside the case 20 through the positive and negative terminals 320 and 330. Terminal inserters 35 and 36 may be positive and negative terminal inserters, respectively. The terminal inserters 35 and 36 may be openings formed to penetrate through the cap plate 310. The positive and negative terminals 320 and 330 may be inserted through the terminal inserters 35 and 36, respectively, and may be affixed to the cap plate 310 by the positive and negative fixing members 340 and 350, respectively.

The positive terminal 320 may include a positive terminal plate 321, the positive current collector 327, and a positive connector 325 that connects the positive terminal plate 321 and the positive current collector 327 to each other. The negative terminal 330 may include a negative terminal plate 331, the negative current collector 337, and a negative connector 335 that connects the negative terminal plate 331 and the negative current collector 337. The negative terminal plate 331 and the positive terminal plate 321 may extend in parallel with an upper surface 312 of the cap plate 310.

The positive and negative terminals 320 and 330 may be formed of a metal having an electric conductivity. For example, a metallic plate may be cut and bent in a desired shape according to a press processing method to form the positive and negative terminals 320 and 330. The positive and negative terminals 320 and 330 may be arranged to be symmetrical to each other, and may be shaped to be identical to each other. Thus, only a structure of the positive terminal 320 will be exemplarily described hereinafter.

The positive terminal 320 may include the positive connector 325, which penetrates the terminal inserter 35 to contact the positive terminal plate 321 exposed outside the case 20. Therefore, the positive connector 325 connects the positive current collector 327 and the positive terminal plate 321 to each other. The positive terminal plate 321 may be spaced a predetermined distance from the upper surface 312 of the cap plate 310, and may extend in a longitudinal direction of the cap plate 310. The positive current collector 327 may extend downward, i.e., in a thickness direction of the cap plate 310.

The positive connector 325 may be bent from the positive terminal plate 321 to connect the positive electrode plate 321 and the positive current collector 327 to each other. In detail, the positive connector 325 may include a first positive bending part 322 and a second positive bending part 323. The first positive bending part 322 may be bent from an end of the positive terminal plate 321 to extend downward, e.g., the first positive bending part 322 may extend perpendicularly with respect to the positive terminal plate 321. The second positive bending part 323 may be bent from an end of the first positive bending part 322 to extend in a direction opposite to a direction in which the positive terminal plate 321 extends, e.g., the second positive bending part 323 may be perpendicular to the first positive bending part 322 and may extend away from the positive terminal plate 321. The positive current collector 327 may be combined with the second positive bending part 323 to be electrically connected to the second positive bending part 323.

Shapes of the positive and negative terminals 320 and 330 are exemplary and may be changed into various shapes, including the terminal plates 321 and 331 exposed outside the case 20 and the connectors 325 and 335 connecting the positive and negative current collectors 327 and 337 to the terminal plates 321 and 331.

The positive terminal 320 and the negative terminal 330 may be respectively inserted into the positive terminal inserter 35 and the negative terminal inserter 36. In detail, the positive and negative terminal plates 321 and 331 may be positioned above the cap plate 310, and the positive and negative current collectors 327 and 337 may be positioned under the cap plate 310. In this state, the positive and negative terminals 320 and 330 are fixed into the cap plate 310 by the positive and negative fixing members 340 and 350 respectively inserted into, e.g., filling, the positive and negative terminal inserters 35 and 36. The positive and negative fixing members 340 and 350 may be formed of an electrical insulating plastic. The positive and negative terminal plates 321 and 331 protrude above the cap plate 310 to form gaps D1 and D2 between respective positive and negative terminal plates 321 and 331 and the upper surface 312 of the cap plate 310. The positive and negative terminals 320 and 330 are electrically insulated from the cap plate 310 through the gaps D1 and D2 and the positive and negative fixing members 340 and 350.

The electrical insulating plastic of the positive and negative fixing members 340 and 350 may be a general-purpose plastic, e.g., polyvinyl chloride (PVC), polystyrene, high density polyethylene, acrylonitrile butadiene styrene copolymer (ABS), or the like, a general-purpose engineering plastic, e.g., polyacetal, polyphenylene oxide (PPO), polyphenylene ether (PPE), polyamide (Pam), polycarbonate (PC), polybutylene terephthalate (PBT), or the like, a high-performance engineering plastic, e.g., U polymer, polysulfone (PSF), polyphenylenesulfide (PPS), polyetherimide (PEI), polyethersulfone (PES), polyarylate (PAR), polyether ether ketone (PEEK), polytetrafluoroethylene (PTFE), or the like, or a high heat-resistance engineering plastic, e.g., polyamideimide (PAI), polyimide (PI), or the like. For example, the positive and negative fixing members 340 and 350 may be formed of a resin including PPS and glass fiber of 40%.

The positive and negative fixing members 340 and 350 may have plastic mold structures. In other words, each of the positive and negative fixing members 340 and 350 may be an insert injection molding product formed by injecting and molding the above-described plastic resin into the positive and negative terminal inserters 35 and 36 when the positive and negative terminals 320 and 330 are respectively inserted into the positive and negative terminal inserters 35 and 36. That is, each of the positive and negative fixing members 340 and 350 may be injected and molded into respective positive and negative terminal inserters 35 and 36, while the positive and negative terminals 320 and 330 are in respective positive and negative terminal inserters 35 and 36, in order to fill, e.g., completely fill, positive and negative terminal inserters 35 and 36 around the positive and negative terminals 320 and 330, respectively.

The positive and negative current collectors 327 and 337 are combined with the positive and negative terminals 320 and 330 to be electrically connected to the positive and negative terminals 320 and 330. After the positive and negative terminals 320 and 330 are fixed into the cap plate 310 through the positive and negative fixing members 340 and 350 to complete the cap assembly 30, the electrode assembly 10 is electrically connected to the positive and negative current collectors 327 and 337. The positive current collector 327 is electrically connected to the positive active material non-coated part 11c, and the negative current collector 337 is electrically connected to the negative active material non-coated part 12c. The connection of the positive current collector 327 to the positive active material non-coated part 11c and the connection of the negative current collector 337 to the negative active material non-coated part 12c may be performed, e.g., by ultrasonic welding.

When the cap assembly 30 and the electrode assembly 10 are combined with each other, the electrode assembly 10 is inserted into the case 20 through the opening 21, and the cap plate 310 is combined with the opening 21 of the case 20, e.g., by a laser welding method. Therefore, the opening 21 is closed, and the electrode assembly 10 is electrically exposed outside the case 20 through the positive and negative terminals 320 and 330. After the electrolyte is injected through the inlet 33 into the case 20, the inlet 33 is closed by using the sealing stopper 34 to complete manufacturing of the battery module 1.

In the above-described battery module 1, the positive and negative current collectors 327 and 337 may be respectively formed of, e.g., copper (Cu) and aluminum (Al), having different electrochemical characteristics. The positive and negative terminals 320 and 330 may be formed of material identical to each other. That is, both the positive terminal 320 and the negative terminal 330 are formed of Cu, or, both the positive terminal 320 and the negative terminal 330 are formed of Al. Therefore, a dissimilar metal combination is formed between the positive current collector 327 and the positive terminal 320 or between the negative current collector 337 and the negative terminal 330.

For example, friction stir welding (FSW) may be performed between dissimilar metals instead, e.g., in replacement, of laser welding. Also, a sufficient welding strength may be obtained between dissimilar metals having low weldabilities through the FSW.

In the above-described battery module 1, the positive and negative current collectors 327 and 337 and the positive and negative terminals 320 and 330 may be formed into a single body by using a single metallic plate. In other words, the positive current collector 327, the positive connector 325, and the positive terminal plate 321 may be formed of the same metal. Also, the negative current collector 337, the negative connector 335, and the negative terminal plate 331 may be formed of the same metal. In this case, a combination process into the single body, e.g., by welding or the like, is not necessary, and thus, manufacturing costs are reduced. Also, an electric characteristic of respective current paths from the positive and negative current collector 327 and 337 to the positive and negative plates 321 and 331, respectively, is uniformly maintained.

In the battery module 1, the positive and negative terminals 320 and 330 are combined with the cap plate 310 by the insert injection molding method. Therefore, a combination of and an insulation between the cap plate 310 and the positive and negative terminals 320 and 330 are simultaneously formed.

Figure 4:
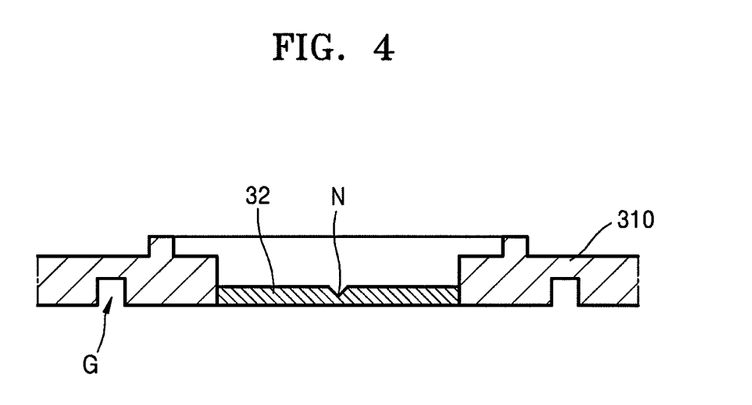
FIG. 4 illustrates an enlarged view of an area of the battery module of FIG. 2.
Figure 5:
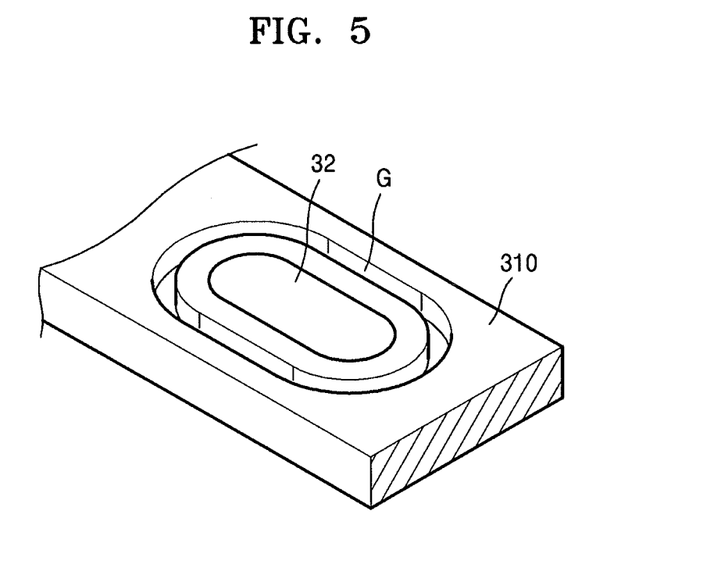
FIG. 5 illustrates an enlarged perspective view of a shape of a groove pattern in a lower surface of a cap plate.
Figure 6:
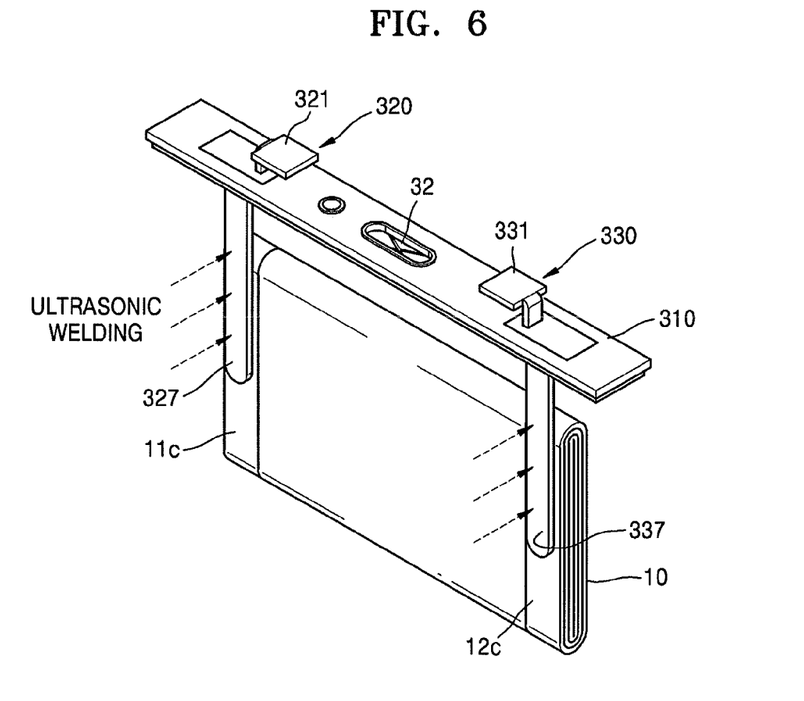
FIG. 6 illustrates a perspective view of a process of connecting current collectors to an electrode assembly.

FIG. 4 illustrates an enlarged view of the dashed portion in FIG. 2. FIG. 5 is a detailed partial perspective view of a groove pattern in a lower surface of the cap plate 310. FIG. 6 is a perspective view of a process of connecting the positive and negative current collectors 327 and 337 to the electrode assembly 10.

Referring to FIGS. 2 and 4, the safety vent 32 is provided in the cap plate 310. For example, the safety vent 32 may be destructed to provide a discharge path for gas, if the pressure in the case 20 exceeds a predetermined pressure. A groove pattern is formed in the cap plate 310 adjacent to the safety vent 32 to attenuate vibrations. For example, as illustrated in FIG. 4, the groove pattern may include a groove G having a predetermined shape. The groove G may have a shape enclosing, e.g., completely surrounding a perimeter of, the safety vent 32 or may have a ring shape corresponding to, e.g., encircling, an external appearance, e.g., shape, of the safety vent 32 as shown in FIG. 5. For example, as illustrated in FIG. 4, the groove G may be formed in a lower surface of the cap plate 310, i.e., in a surface facing an interior of the case 20, and the notch N may be formed in an upper surface of the safety vent 32, i.e., in a surface facing away from the interior of the case 20.

Referring to FIG. 4, the safety vent 32 is formed as a plate thinner than the cap plate 310, e.g., as measured along a vertical direction normal to a bottom of the case 20, and includes at least one notch N. The notch N may be formed as a cut line, e.g., to be destructed to discharge the gas when the internal pressure of the battery module 1 rises above a predetermined pressure. In other words, when the internal pressure inside the case 20 exceeds a predetermined reference pressure, the safety vent 32 is destructed based on the notch N to discharge the gas from the case 20.

Referring to FIG. 6, vibrations may occur when the positive and negative current collectors 327 and 337 are combined with the electrode assembly 10 through ultrasonic welding. In addition, a connection strength of the positive and negative terminals 320 and 330 to the cap plate 310 via the insert injection molding method may be weaker than, e.g., a structure in which the positive and negative terminals 320 and 330 and the cap plate 310 are combined by using a member such as a gasket having a vibration attenuating function. Therefore, as the notch N is a weak part of the safety vent 32, the vibrations occurring during the ultrasonic welding and during the connection between the terminals 320 and 330 and the cap plate 310 may potentially spread toward the notch N and cause damage thereto.

Accordingly, according to example embodiments, the groove G may be formed around the safety vent 32, thereby reducing vibrations transmitted to the safety vent 32 and the notch N. In detail, as an area of the cap plate 310 including the groove G becomes weaker with regard to vibrations relatively to other areas of the cap plate 310, vibrations may spread toward the groove G. As such, vibrations are reduced before being transmitted beyond the groove G toward the safety vent 32 and the notch N. A shape of the groove G may be changed into various shapes, as will be discussed with reference to FIGS. 7A-7E.

FIGS. 7A through 7E illustrate partial perspective views of groove patterns according to various exemplary embodiments. A groove pattern may include a plurality of grooves that are disposed symmetrically based on the safety vent 32.

Figure 7A:
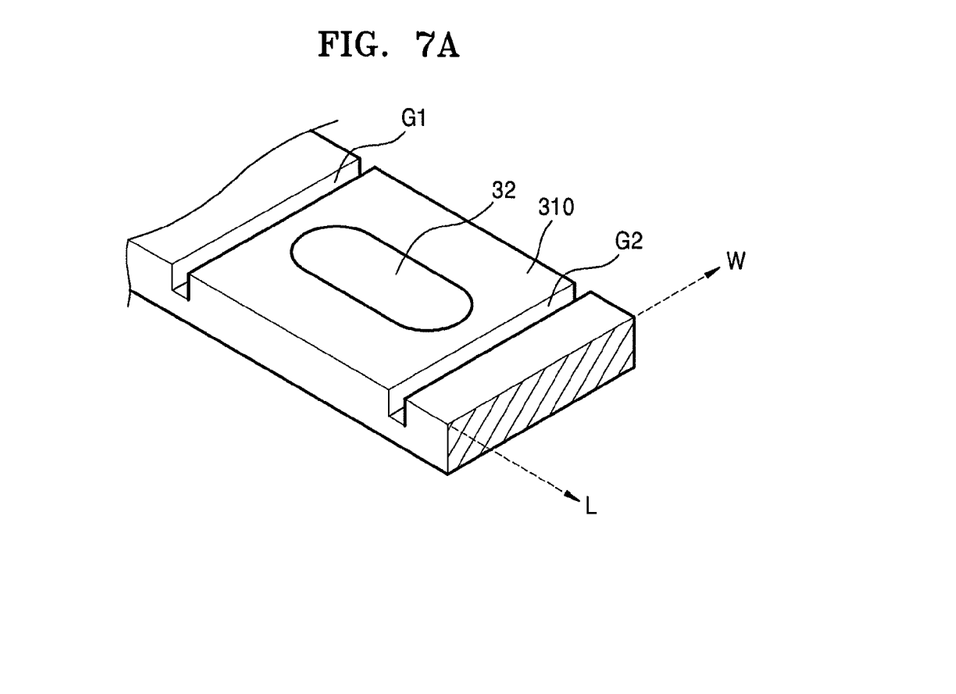
FIGS. 7A through 7E illustrate enlarged perspective views of groove patterns according to various exemplary embodiments.
Figure 7B:
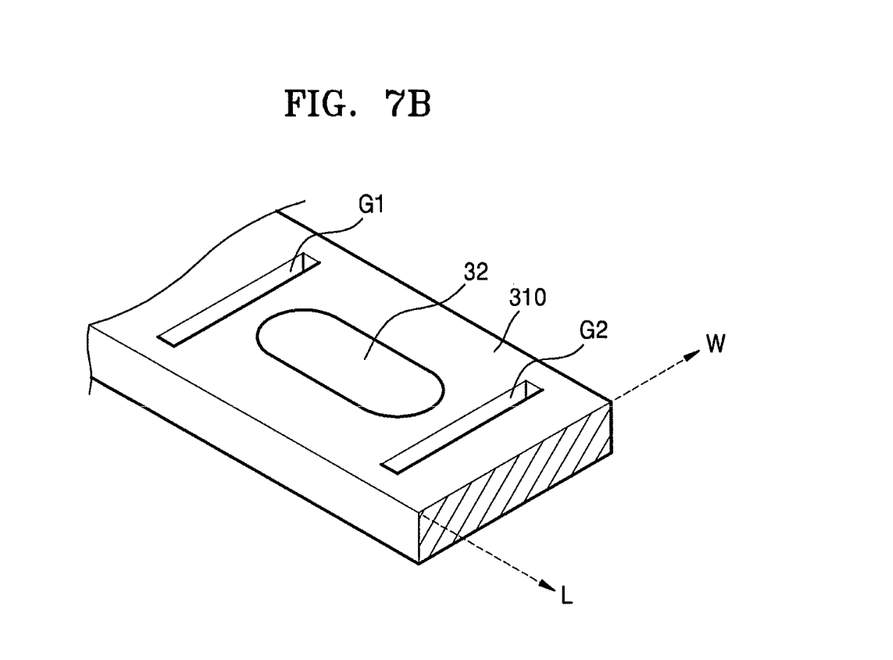

For example, as shown in FIG. 7A, the groove pattern may include first and second grooves G1 and G2 that are parallel and spaced apart from each other, with the safety vent 32 therebetween. For example, the first and second grooves G1 and G2 may be spaced apart from each other along a longitudinal direction (L) of the cap plate 310 and may extend along a width direction (W) of the cap plate 310, perpendicular to the longitudinal direction (L). The safety vent 32 may extend along the longitudinal direction (L), between the first and second grooves G1 and G2. Longitudinal directions of the first and second grooves G1 and G2 may be formed along a width direction of the cap plate 310. For example, the first and second grooves G1 and G2 may have the same lengths as a width of the cap plate 310, as illustrated in FIG. 7A. In another example, the first and second grooves G1 and G2 may have lengths shorter than the width of the cap plate 310, as illustrated in FIG. 7B.

Figure 7C:
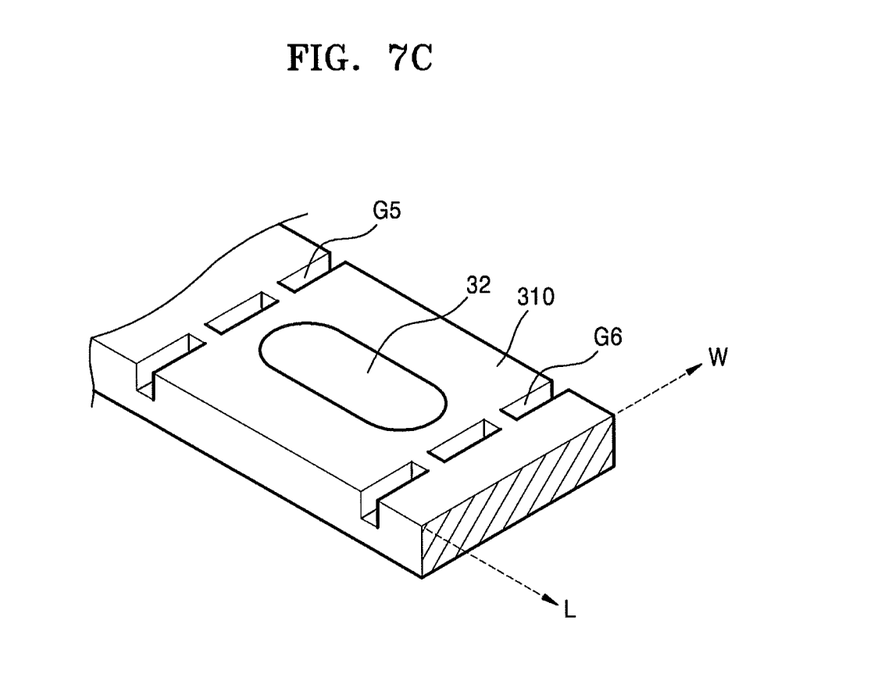

Referring to FIG. 7C, the groove pattern may include first and second grooves G5 and G6 that are spaced apart from each other across the safety vent 32 in the longitudinal direction (L) of the cap plate 310. A plurality of first grooves G5 are spaced apart from one another, and a plurality of second grooves G6 are spaced apart from one another along the width direction (W) of the cap plate 310. In other words, each of the first and second grooves G5 and G6 includes a plurality of discrete grooves aligned along and spaced apart from each other along the width direction (W).

Figure 7D:
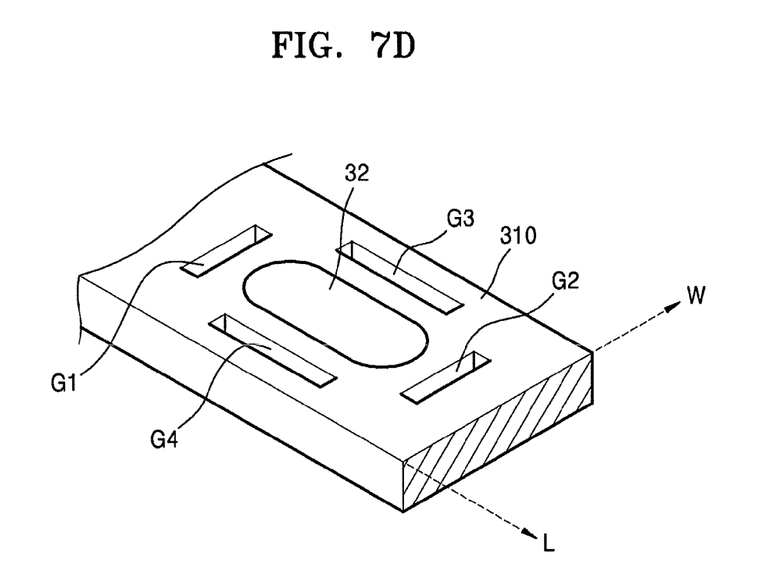

Referring to FIG. 7D, the groove pattern includes first and second grooves G1 and G2 that are spaced apart from each other across the safety vent 32 in the longitudinal direction (L) of the cap plate 310. The groove pattern further includes third and fourth grooves G3 and G4 that are spaced apart from each other across the safety vent 32 in the width direction (W) of the cap plate 310. As shown in FIG. 7D, the third and fourth grooves G3 and G4 extend along the longitudinal direction (L) of the cap plate 310, and thus longitudinal directions of the third and fourth grooves G3 and G4 are formed along the longitudinal direction of the cap plate 310.

Figure 7E:
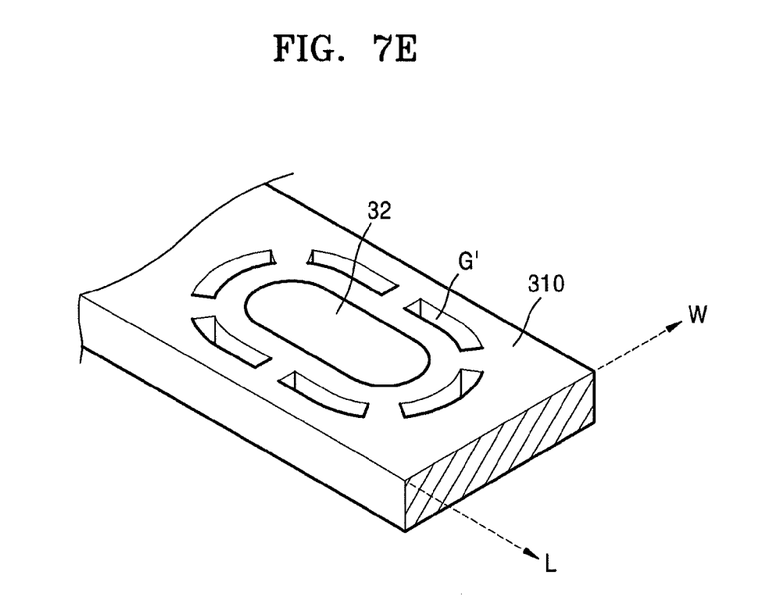

Referring to FIG. 7E, the groove pattern includes a plurality of, e.g., discrete, grooves G' that are spaced apart from one another to enclose, e.g., surround, the safety vent 32.

In the above description, a shape of the safety vent 32 is exemplary. Also, a position, a shape, and a number of the notch N in the safety vent 32 may be variously changed to ease the gas discharge caused by an increase in the internal pressure of the battery module 1. The groove pattern may be formed around the safety vent 32 to attenuate vibrations in the safety vent 32, when the positive and negative current collectors 327 and 337 are combined with the electrode assembly 10 by the ultrasonic welding. Therefore, damage to the safety vent 32 may be prevented or substantially minimized.

It is noted that the groove pattern is not limited to the exemplified shapes. That is, the groove pattern may be formed in any suitable position and shape to be adjacent to the safety vent 32 in consideration of the position, shape, and the number of notches N formed in the safety vent 32. Also, the groove pattern is formed in the lower surface of the cap plate 310, but is not limited thereto. Therefore, the groove pattern may be formed in an upper surface of the cap plate 310 or in both of upper and lower surfaces of the cap plate 310.

Figure 8:
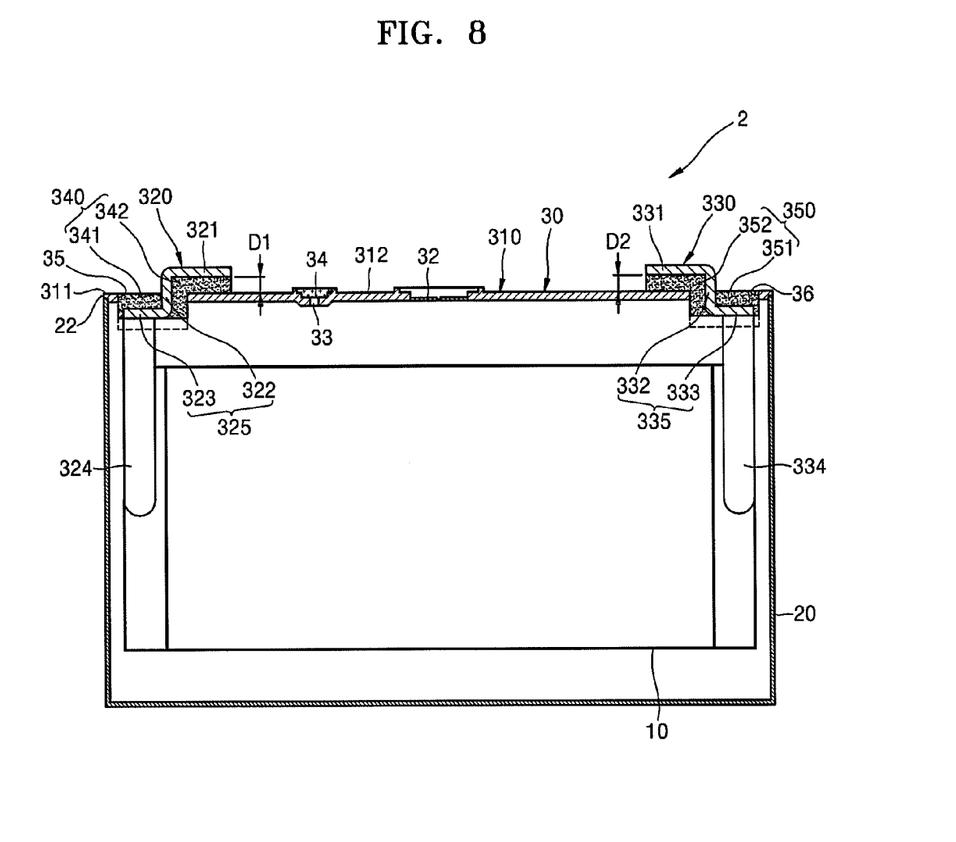
FIG. 8 illustrates a cross-sectional view of a battery module according to another exemplary embodiment.

FIG. 8 illustrates a cross-sectional view of a battery module 2 according to another exemplary embodiment.

Referring to FIG. 8, fixing members 340' and 350' may be respectively formed inside the terminal inserters 35 and 36, and may extend to fill the gaps D1 and D2 between the terminal plates 321 and 331 and the upper surface 312 of the cap plate 310. In other words, the fixing members 340' and 350' may include respective first fixers 341 and 351 filling the terminal inserters 35 and 36, and respective second fixers 342 and 352 filling the gaps D1 and D2 between the terminal plates 321 and 331 and the upper surface 312 of the cap plate 310.

As in the previous exemplary embodiment, the fixing members 340 and 350 may be formed by an insert injection molding method. According to this structure, a combination strength between the positive and negative terminals 320 and 330 and the cap plate 310 is improved. In other words, the second fixers 342 and 352 increase a contact area between the positive and negative terminals 320 and 330 and the cap plate 310 and the fixing members 340 and 350 to improve the combination strength between the positive and negative terminals 320 and 330 and the cap plate 310. Also, positive and negative terminal plates 321 and 331 are supported on the cap plate 310 by the second fixers 342 and 352. Therefore, a potential separation between the fixing members 340' and 350' and the terminal inserters 35 and 36 during their combination process may be prevented or substantially minimized.

A groove pattern including the groove G having a shape as shown in FIGS. 4 and 7A through 7E or a modified shape thereof is formed in the cap plate 310 adjacent to the safety vent 32. Therefore, damage to the safety vent 32 may be prevented or substantially reduced when performing ultrasonic welding with respect to the electrode assembly 10 and the current collectors 327 and 337.

The above-described battery modules 1 and 2 have structures in which the cap plate 310 and the positive and negative terminals 320 and 330 are fixed by the fixers 340 and 350 formed by a plastic mold. However, example embodiments are not limited thereto.

Figure 9:
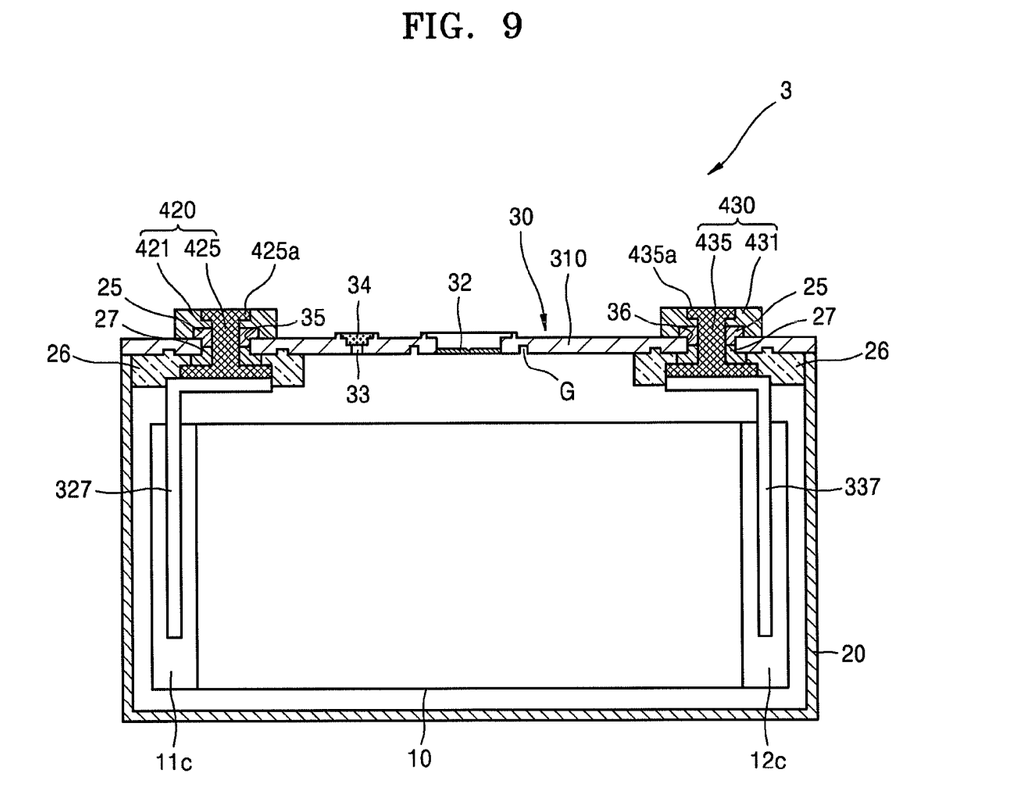
FIG. 9 illustrates a cross-sectional view of a battery module according to another exemplary embodiment.

FIG. 9 illustrates a cross-sectional view of a battery module 3 according to another exemplary embodiment. The present exemplary embodiment is different from the previous exemplary embodiments in that positive and negative terminals 420 and 430 are fixed into the cap plate 310 by gaskets.

The positive current collector 327 is electrically connected to the positive terminal 420. The positive terminal 420 may include a positive terminal plate 421 and a positive connector 425 that connects the positive current collector 327 to the positive terminal plate 421. The positive connector 425 is exposed outside through the terminal inserter 35 and protrudes from the cap plate 310 by a predetermined length.

The negative current collector 337 is electrically connected to the negative terminal 430. The negative terminal 430 may include a negative terminal plate 431 and a negative connector 435, which connects the negative current collector 337 to the negative terminal plate 431. The negative connector 435 is exposed outside through the terminal inserter 36 and protrudes from the cap plate 310 by a predetermined length.

The positive and negative terminals 420 and 430 are combined with the cap plate 310 while being insulated from the cap plate 310. Insulating gaskets 25 and 27 are interposed between the positive and negative terminals 420 and 430 to insulate the positive and negative terminals 420 and 430 and the cap plate 310 from each other. For example, the insulating gaskets 25 and 27 are divided into upper gaskets 25 and lower gaskets 27. The upper gaskets 25 are inserted from an upper part of the cap plate 310 into terminal inserters 35 and 36, and the lower gaskets 27 are inserted from a lower part of the cap plate 310 into the terminal inserters 35 and 36. Besides the upper and lower gaskets 25 and 27, insulating sealants 26 may be additionally provided to insulate the positive and negative connectors 425 and 435 from the cap plate 310 or the case 20.

The positive and negative terminal plates 421 and 431 and the positive and negative connectors 425 and 435 form rivet combinations. For example, front ends 425a and 435a of the positive and negative connectors 425 and 435 inserted into the terminal plates 421 and 431 are rivet-processed to be widespread and pressure-welded to the positive and negative terminal plates 421 and 431. The positive and negative terminal plates 421 and 431 are pressure-welded to the front ends 425a and 435a of the rivet-processed positive and negative connectors 425 and 435. The positive and negative terminal plates 421 and 431 are firmly combined with the positive and negative connectors 425 and 435. However, example embodiments are not limited thereto. According to another exemplary embodiment, the positive and negative plates 421 and 431 may be combined with the positive and negative connectors 425 and 435 by other appropriate methods.

A groove pattern including a groove G having a shape as shown in FIGS. 4 and 7A through 7E or a modified shape thereof is formed in an area of the cap plate 310 adjacent to the safety vent 32. Therefore, damage to the safety vent 32 may be prevented or substantially reduced when the electrode assembly 10 is ultrasonically welded to the positive and negative current collectors 327 and 337

A battery module as described above may include a vibration attenuating battery pattern in an area of a cap plate adjacent to a safety vent. Therefore, cracks occurring in a safety vent of a conventional secondary battery during manufacturing thereof may be prevented or substantially minimized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   an electrode assembly in a case;
   at least one current collector in the case, the current collector being electrically connected to the electrode assembly;
   a cap plate covering the case, the cap plate including a safety vent and at least one terminal inserter penetrating the cap plate;
   at least one terminal part including a terminal plate outside the case and a connector connecting the at least one current collector to the terminal plate through the at least one terminal inserter;
   at least one fixing member fixing the terminal part into the cap plate; and
   a groove pattern in an area of the cap plate adjacent to the safety vent, the groove pattern facing an interior of the case, and a portion of the cap plate separating the groove pattern from the safety vent along a horizontal direction, the horizontal direction being parallel to the safety vent.

2. The battery module as claimed in claim 1, wherein the fixing member has a plastic mold structure, the plastic mold structure including a plastic resin filling the terminal inserter around the connector.

3. The battery module as claimed in claim 2, wherein the terminal plate is spaced apart from an upper surface of the cap plate.

4. The battery module as claimed in claim 3, wherein the connector includes:
   a first bending part extending downwardly from the terminal plate; and
   a second bending part extending from the first bending part in parallel with the terminal plate.

5. The battery module as claimed in claim 4, wherein the second bending part is partially buried in the fixing member.

6. The battery module as claimed in claim 4, wherein the second bending part is entirely buried in the fixing member.

7. The battery module as claimed in claim 3, wherein the fixing member includes a first fixer filling the terminal inserter and a second fixer filling a gap between the terminal plate and the upper surface of the cap plate.

8. The battery module as claimed in claim 7, wherein the second fixer extends to an upper portion of the first fixer.

9. The battery module as claimed in claim 8, wherein the second fixer extends across an edge of the terminal inserter.

10. The battery module as claimed in claim 1, wherein the fixing member includes an insulating gasket between the connector and the cap plate, the insulating gasket filling a space between the connector and the terminal inserter.

11. The battery module as claimed in claim 10, wherein the insulating gasket includes:
    an upper gasket extending from an upper surface of the cap plate into the terminal inserter; and
    a lower gasket extending from a lower surface of the cap plate into the terminal inserters.

12. The battery module as claimed in claim 1, wherein the groove pattern includes a plurality of grooves that are symmetrical to one another with respect to the safety vent.

13. The battery module as claimed in claim 1, wherein the groove pattern includes a first groove and a second groove spaced apart from each other across the safety vent in a longitudinal direction of the cap plate.

14. The battery module as claimed in claim 13, wherein the first and second grooves extends along a width direction of the cap plate perpendicular to the longitudinal direction of the cap plate.

15. The battery module as claimed in claim 14, wherein a plurality of the first grooves is spaced apart from one another along the width direction, and a plurality of the second grooves is spaced apart from one another along the width direction.

16. The battery module as claimed in claim 14, wherein the groove pattern further comprises a third groove and a fourth groove spaced apart from each other across the safety vent along the width direction.

17. The battery module as claimed in claim 16, wherein the third and fourth grooves extends along the longitudinal direction of the cap plate.

18. The battery module as claimed in claim 1, wherein the groove pattern includes a groove having a shape surrounding the safety vent.

19. The battery module as claimed in claim 1, wherein the cap plate includes a protrusion protruding away from the case, the groove pattern being spaced apart from the protrusion along the horizontal direction to be positioned between the protrusion and the at least one fixing member.

20. The battery module as claimed in claim 1, wherein the groove pattern includes a plurality of discrete grooves spaced apart from one another, the plurality of grooves being arranged in a shape surrounding the safety vent.

* * * * *